(12) United States Patent
McGeever et al.

(10) Patent No.: US 10,112,669 B1
(45) Date of Patent: Oct. 30, 2018

(54) VERSATILE BICYCLE LIGHT MOUNTING SYSTEM

(71) Applicant: Light & Motion Industries, Marina, CA (US)

(72) Inventors: Benjamin McGeever, Mukilteo, WA (US); Dave Heiss, Mukilteo, WA (US)

(73) Assignee: Light & Motion Industries, Marina, CA (US)

( * ) Notice: Subject to any disclaimer, the term of this patent is extended or adjusted under 35 U.S.C. 154(b) by 10 days.

(21) Appl. No.: 15/089,393

(22) Filed: Apr. 1, 2016

(51) Int. Cl.
*B62J 7/06* (2006.01)
*B62J 11/00* (2006.01)
*B62J 6/00* (2006.01)
*H04B 1/3877* (2015.01)

(52) U.S. Cl.
CPC ............... *B62J 11/00* (2013.01); *B62J 6/00* (2013.01); *H04B 1/3877* (2013.01)

(58) Field of Classification Search
CPC ....... B62J 11/00; B62J 6/00; B62J 6/02; B62J 6/04
USPC .......................................... 362/473; 224/473
See application file for complete search history.

(56) References Cited

U.S. PATENT DOCUMENTS

| | | | | |
|---|---|---|---|---|
| 4,433,899 A * | 2/1984 | Sellet | ................. | B62J 29/00 248/479 |
| 5,181,774 A * | 1/1993 | Lane | ................. | B62J 6/02 224/421 |
| 5,355,746 A * | 10/1994 | Lin | ................. | B62J 11/00 224/420 |
| 5,833,534 A * | 11/1998 | Lai | ................. | F21L 15/14 362/191 |
| 5,845,885 A * | 12/1998 | Carnevali | ................. | F16M 11/14 248/181.1 |
| 5,921,669 A * | 7/1999 | Taylor | ................. | B62J 6/00 362/191 |
| 6,522,748 B1 * | 2/2003 | Wang | ................. | B60R 11/02 379/446 |
| 8,366,064 B2 * | 2/2013 | Chen | ................. | F16M 11/043 224/416 |
| 9,096,286 B1 * | 8/2015 | Lin | ................. | B62J 7/04 |
| 2010/0214793 A1 * | 8/2010 | Retief | ................. | B62J 6/16 362/473 |
| 2014/0263509 A1 * | 9/2014 | Oquendo | ................. | B62J 11/00 224/447 |
| 2015/0172517 A1 * | 6/2015 | Chen | ................. | H04N 5/2251 348/376 |

OTHER PUBLICATIONS

Go Big Pro Saddle Rail Mount, description and views of K-EDGE saddle rail mount, print from k-edge.com website, copyright 2016, K-EDGE, 2 pages.

(Continued)

*Primary Examiner* — Derek Battisti
(74) *Attorney, Agent, or Firm* — Thomas M. Freiburger (57) ABSTRACT

A mounting system for a bicycle light, camera, bike computer, smartphone or other device has versatile application to front or rear of the bike, to fix the light or device in position at the desired orientation. The mounting system has a ball arm engaged by adjustable clamps, one on each of two ball ends of the ball arm, providing a wide range of adjustments to attach the light housing or device to different configurations of bicycle stems and to seat rails below the seat, accommodating a range of different spacings and angles.

6 Claims, 6 Drawing Sheets

(56) References Cited

OTHER PUBLICATIONS

Cateye Saddle Rail Mount, description and view of CatEye saddle rail mount, print from amazon.com website, copyright 1996-2017, Amazon.com, Inc., 3 pages.
Bar Fly Tail Gunner, description and view of Bar Fly camera saddle rail mount, print from barflybike.com website, copyright 2016, Barfly, 3 pages.
Moon Comet Saddle Rail Bracket, description and views of Moon Comet saddle rail bracket, print from bikebug.com website, copyright 2012-2017, Bikebug, 3 pages.
Exposure Lights Saddle Rail Mount, description and view of saddle rail mount, print from exposurelights.com website, copyright 2017, Ultimate Sports Engineering Ltd., 3 pages.
Minoura Saddle Mount Bottle Cage Holder, description and views of saddle mount, print from minoura.jp website, copyright 2012, Minoura Japan, 1 page.

* cited by examiner

VERSATILE BICYCLE LIGHT MOUNTING SYSTEM

BACKGROUND OF THE INVENTION

This invention concerns generally mounting systems for connection of a light or camera to a bicycle, and in particular concerns a compact and versatile system for securing a bicycle light, smartphone, camera or bike computer to a front handlebar mount or to seat rails beneath the seat surface of a bicycle, allowing for securement to components having a variety of spacings and orientations.

Bicycle lights have been securable to bicycles in many different ways, sometimes with plastic straps that grip around handlebars or seat posts, sometimes with elastic bands, and often with plastic or metal brackets. Bike computers and cameras have also been securable to bicycles in various ways. Some degree of aim adjustment is usually necessary, particularly aiming height of a light or camera.

Tail lights are usually connected to a seat post, but this can interfere with tool packs that are typically secured under the bicycle seat. Cameras have also been secured to seat posts. Front lights are usually connected to handlebars, but some have been securable to one of the machine bolts that secure the handle bar to the stem over the front wheel. Bike computers have also been secured to handlebars.

There has been a need for a more efficient, versatile and aesthetic bicycle light mounting, also for other devices, with a wide range of adjustments to connect to seat rails or bars or front stem machine bolts with different spacings and orientations.

SUMMARY OF THE INVENTION

The bicycle light mounting system of the invention has versatile application to a front light or tail light or to other devices for front or rear mounting, to fix the light or device in position at a desired orientation. The mounting system has a ball arm with adjustable clamps, one on each of two ball ends of the ball arm, providing a wide range of adjustments to attach the light housing to different configurations of handle bar/stem connections and to seat rails below the seat, in a wide range of different spacings and angles. In addition, the mounting system can be used for a camera, bike computer, smartphone or other device to be secured to a bicycle at front or rear.

As a front light mount, the ball arm is attached to the back of the light housing so that the ball ends are at left and right. Two ball clamps are engaged, one on each ball. Each of these clamps is tightened down on the ball via a machine screw at an opposite end of the clamp from the ball, a machine screw being part of the bicycle's handlebar-stem connection. The other clamp is secured to another of such stem bolts. The spread and orientation of the clamps can be manipulated to fit almost any handlebar connection fixture having two or four such machine screws. Machine screws that are oriented vertically, horizontally or any other orientation near or between vertical and horizontal can be accommodated using the two clamps and the ball arm. The clamps also will secure to any of the different lateral spreads between these machine screws.

As an under-seat mount, the invention provides for the same ball arm to be used, again secured to the back side of a device housing. Other devices can also be supported at rear. In this case the two clamps that engage the balls have clamps at both ends: one end to grip the ball and another to grip a seat rail or bar at the underside of the bicycle seat. A bolt and nut (or threaded hole) are positioned between the two ends, so that tightening of this bolt clamps both ends simultaneously and tightly, one end clamped to the seat rail and one clamped to a ball of the ball arm.

Whether at front or rear, the mounting system allows rotation for pitch adjustment of the light or device before final tightening, by rotation of the balls within the clamps.

The invention achieves an efficient and elegant solution to the problem of front and rear light or device mounting to a bicycle, using a versatile ball arm mechanism that can be attached either at front or rear. This is a primary objective of the invention. Other objects, advantages and features of the invention will be apparent from the following description of a preferred embodiment, considered along with the accompanying drawings.

DESCRIPTION OF PREFERRED EMBODIMENTS

Figure 1:
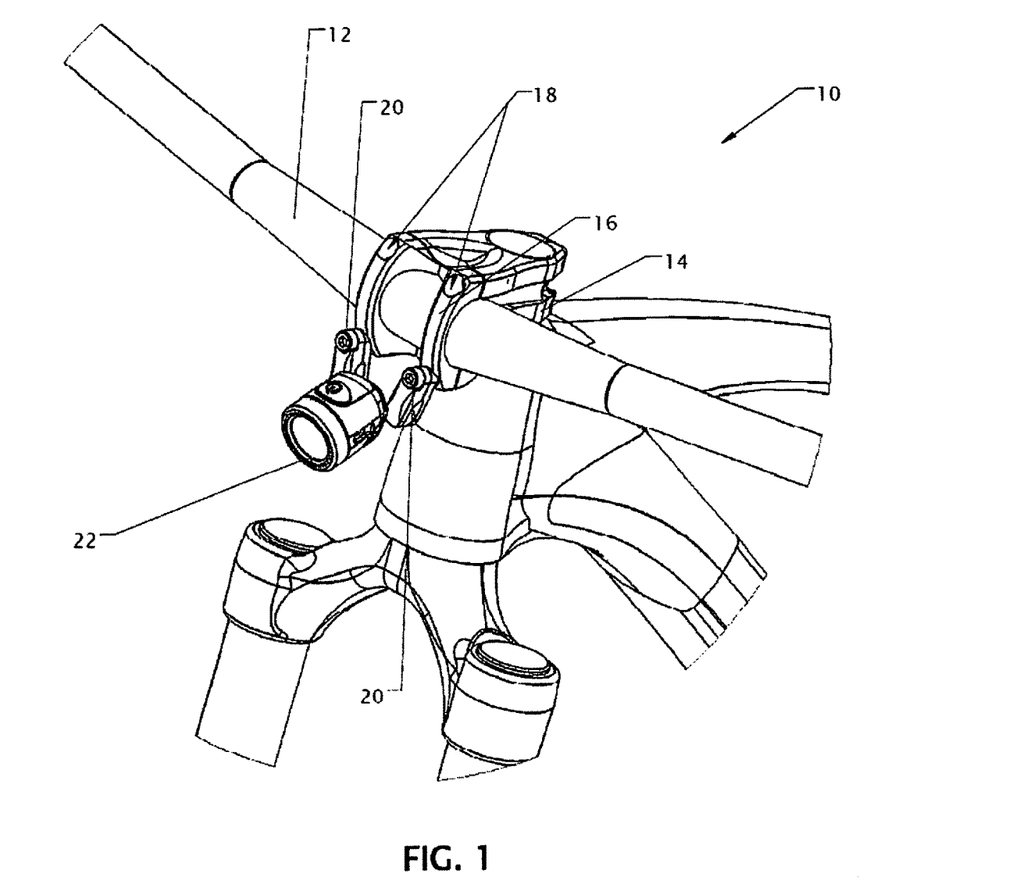
FIG. 1 is a perspective view showing a front bicycle light secured to a stem of a bicycle using the mounting system of the invention.

In the drawings, FIG. 1 shows a front or bicycle 10, wherein the handlebar 12 is connected to a stem 14 of the bike by a collar 16 that clamps against and grips the handlebar. Some of these have two machine bolts, some have four; on this bicycle the collar has four bolts, a pair of upper bolts 18 and a pair of lower bolts 20. As can be seen in FIGS. 1 through 5, the lower bolts 20 are used in this case to secure a front light 22 onto the bicycle. These bolts 20 are longer than the original bolts so as to be capable of passing through the mounting device of the invention and to perform the function of these lower bolts on the stem collar 16.

Figure 2:
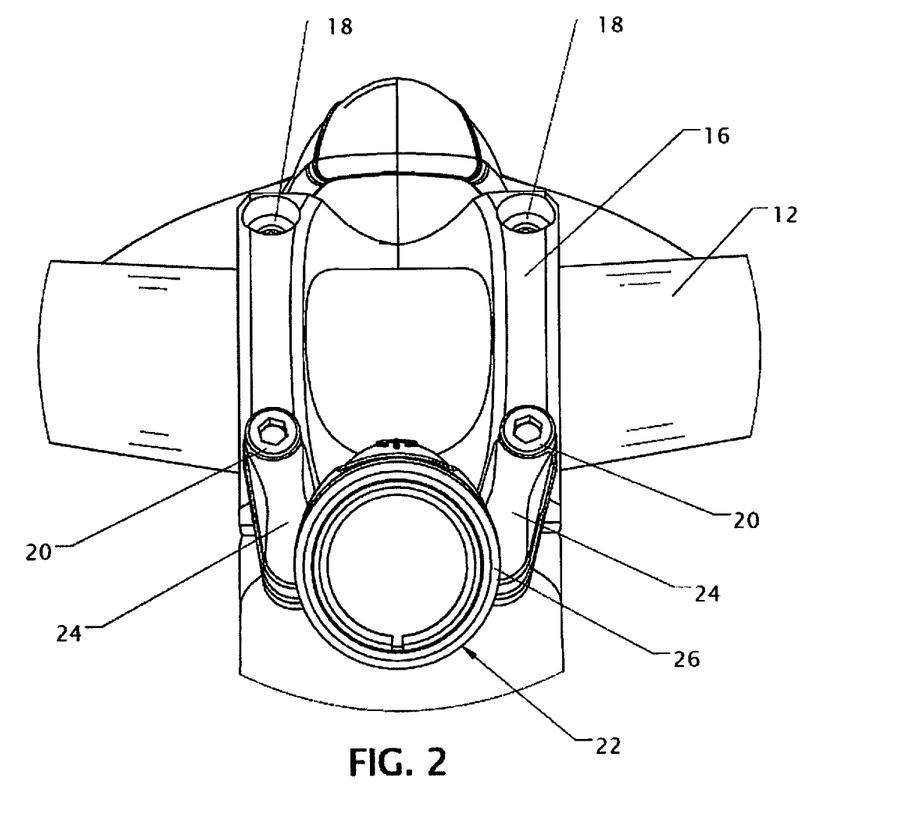
FIG. 2 is a front elevation view showing the light and mounting.

FIG. 2 is a frontal view showing the bicycle's stem clamp 16 as well as the mounting system of the invention for the front bike light 22. A pair of clamps 24 of the mounting system are secured by the machine bolts 20 to the bicycle stem, and at the same time these bolts 20 tighten down the clamps 24 to hold the housing 26 of the front light firmly in place at the elevational angle selected by the user.

Figure 3:
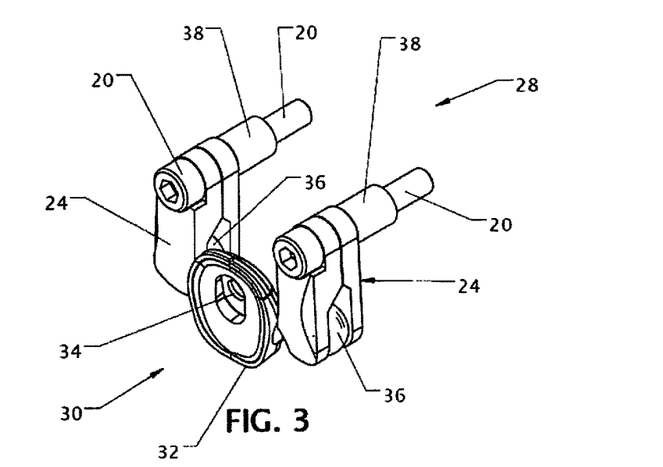
FIG. 3 is a perspective view of the light mounting system.
Figure 4:
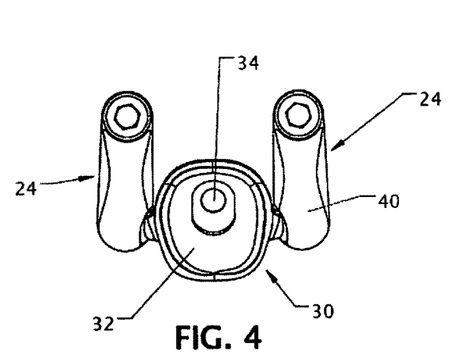
FIG. 4 is a front elevation view of the light mounting.
Figure 5:
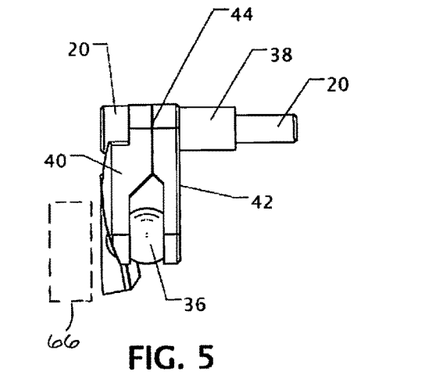
FIG. 5 is a side elevation view of the light mounting.

FIG. 3 shows the mounting system 28 of the invention without the light housing. This mounting system includes three main components. A ball arm 30 is securable to the back side of the light housing (not shown in this view) via a housing seat or mounting plate 32. The securement to the light housing is via a bolt hole 34 in the mounting plate for a machine bolt to pass through and secure the plate to the rear of the housing. This connection is better seen in other views described below. As can be seen in FIGS. 3-5, the ball arm extends from both sides of the mounting plate 32, to a ball 36 at each end. These balls are engaged by the clamps 24, which grip the balls 36 very tightly when the machine screws 20 are torqued down sufficiently.

The drawings also show a spacer collar 38 on each machine bolt 20, just behind the respective clamp. These collars are about the diameter of the heads of the machine bolts 20, since, as seen in FIGS. 1 and 2, the stem bolts on a typical bike will seat in a recess formed in the stem clamp 16. Thus, the spacer collars 38 are present to engage those recesses, since the flat back ends of the clamps 24 would not be able to do so. The spacer collars 38 can be integral with the clamps, or they can be separate pieces.

FIGS. 3 and 5, particularly FIG. 5, show the construction of the clamps 24. Each is split and formed of two separate legs 40 and 42, and each has a concave or dish-shaped recess near its outer end for close engagement with the ball 36. FIG. 5 shows the two clamp legs 40 and 42 have flat regions 44 that can be fully pressed together when the ball 36 is very tightly engaged, but they could remain slightly spaced apart when sufficient clamping force has been applied.

As noted above, the mounting system 28 can support devices other than lights, such as a camera, a bike computer or a smartphone. A bolt or adapter can be used to secure the device to the ball arm fixture 30. In the case of a smartphone, cradles to hold smartphones are well known and common, and can be secured to the fixture 32 by a machine screw. A smartphone can communicate via Bluetooth (or other proximate wireless communication) with a bike computer mounted somewhere on the bike, the smartphone having an app to display speed, elevation, route, history, etc., or even to produce sounds to signal the rider to certain conditions.

As explained above, the use of the two clamps 24, engaged with the balls 36 of the ball arm 30, enable a great range of bicycle stem configurations on which the mounting assembly 28 will be compatible. In FIGS. 3 and 4 the ball clamps are seen essentially in vertical orientation, such that the stem bolts are fairly close together. They could be even closer, with the clamps 24 angled inwardly toward one another at upper ends. FIG. 2, on the other hand, shows stem bolts that are positioned slightly farther apart, with the two clamps 24 angled outwardly at their upper ends. A much wider spread of bolts could also be accommodated, limited only by the maximum reach of the clamps (wherein they would be in alignment). Additionally, bicycle stem clamps differ considerably in the orientation of the bolts. Some bolts can be vertically oriented, or close to vertical, and some can be horizontal or close to horizontal. FIGS. 1 and 2 show bolts (18, 20) that are angled somewhat upwardly/forwardly, e.g. about 5° to 10°. Bolts can be at top, or even angled back toward the rider somewhat. Any of these angles can be accommodated by the clamp and ball system of the invention. Further, the aiming angle of the light 22 or other device is easily adjusted, when the bolts 20 are not fully tightened on the clamps.

FIGS. 6 through 10 show the invention for use on a bicycle tail light, to be secured to the seat rails below the seat 48 of a bicycle. A tail light is discussed here, but a camera or other device could be mounted at this position if desired.

Figure 6:
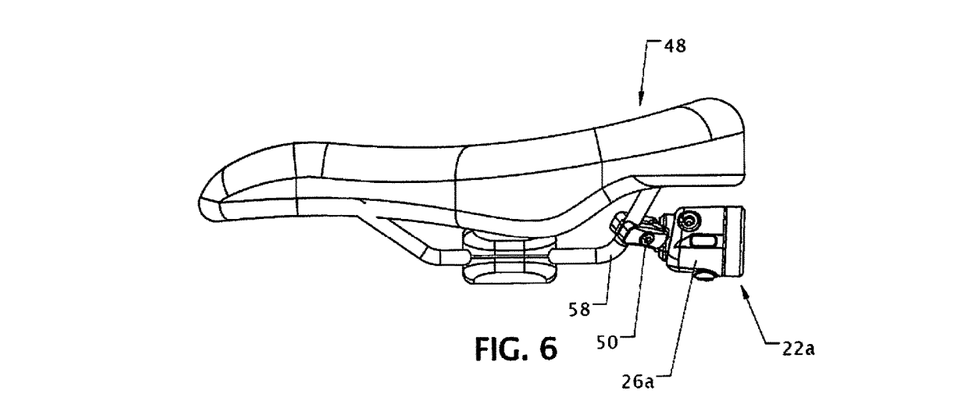
FIG. 6 is a side view of a bicycle seat with a tail light secured to the seat rails with the mounting system of the invention.
Figure 7:
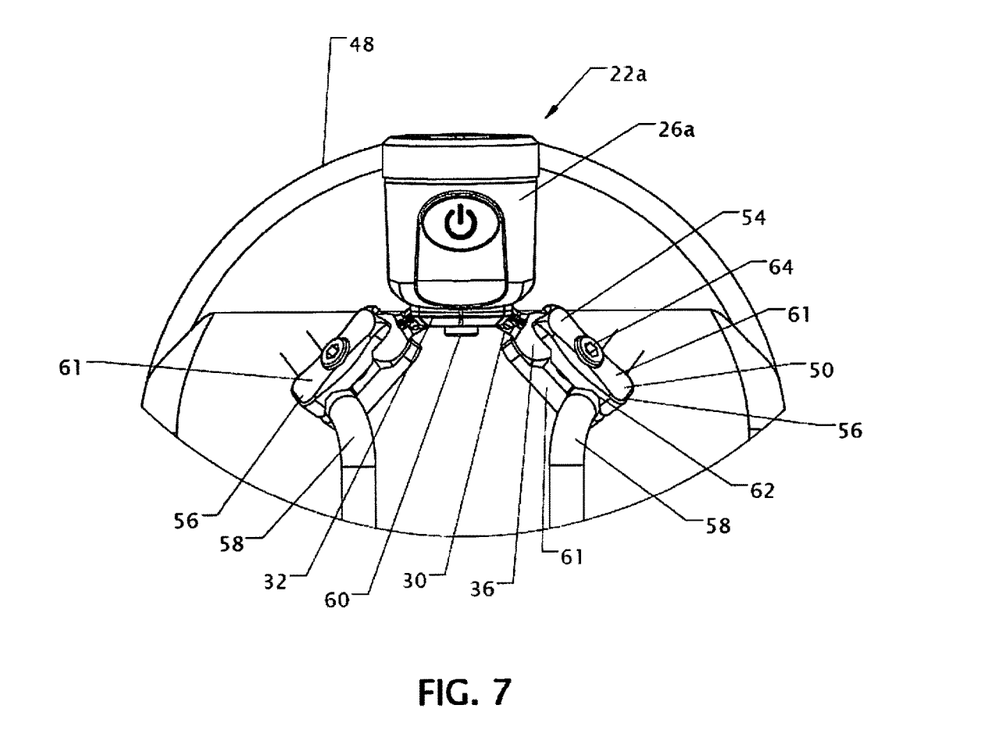
FIG. 7 is a bottom view showing the securement to the seat rails.
Figure 8:
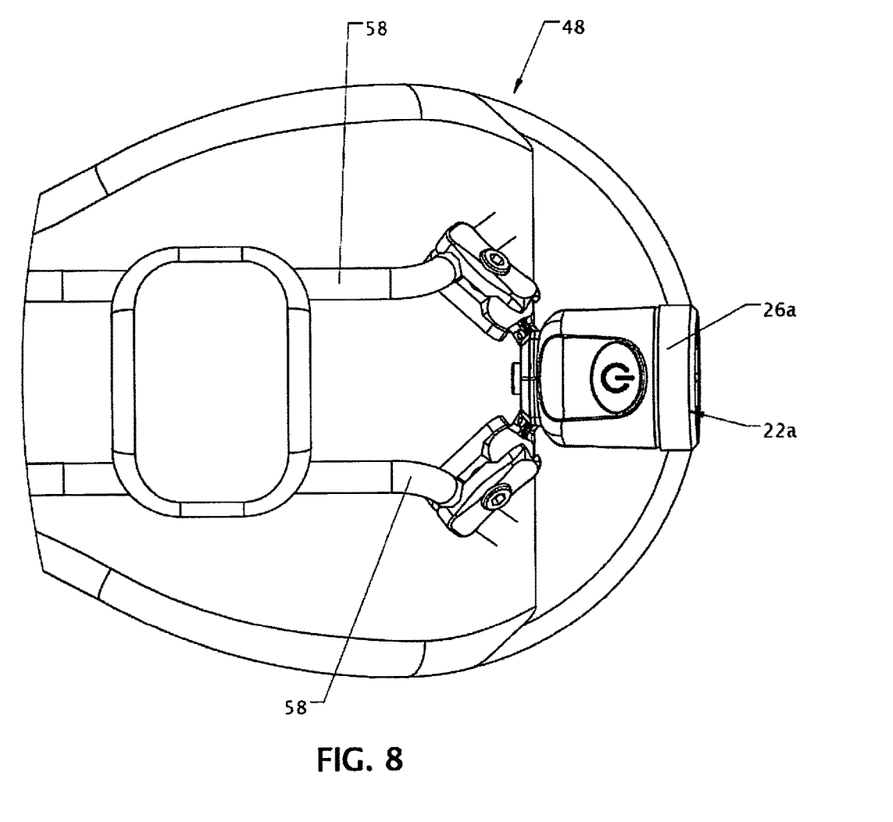
FIG. 8 is a bottom plan view with the tail light and mounting system on a different type of bicycle seat.
Figure 9:
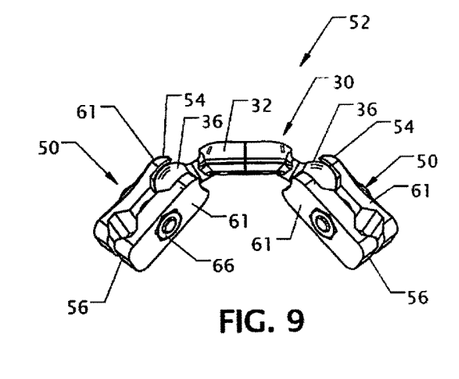
FIG. 9 is a view, essentially in plan, showing the mounting system for seat rails.
Figure 10:
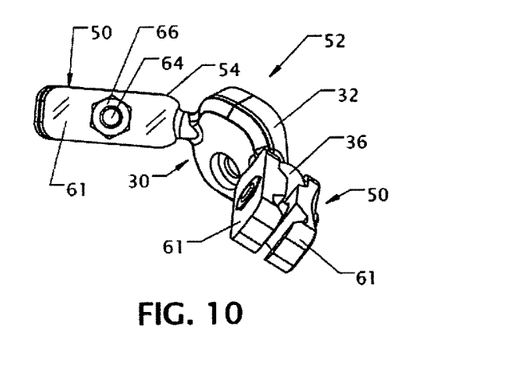
FIG. 10 is a perspective view showing the seat rail mounting system.

FIGS. 7 and 9 show the ball arm 30 in a better view, this being the same ball arm as in the front mount assembly shown in FIGS. 1-5. However, clamps 50 in this tail light mounting assembly 52 are different from those described above. These clamps 50 have a ball clamp 54 at one end, each to grip a respective ball, but a rail clamp 56 at the opposite, forming an essentially cylindrical cavity for gripping a pair of seat rails 58 as shown in FIGS. 6, 7 and 8. The light 22a shown in these views is a tail light, with a housing 26a. The rear of the housing 26a is the same as that of the front light housing 26, complementarily shaped to the seat or mounting plate 32 at center of the ball arm fixture (FIGS. 3 and 4 show the housing-engaging face of the seat or plate 32). A machine bolt or screw 60 is assembled through the hole 34 in the plate 32 and threaded into a threaded bore in the light housing 26a, just as in the assembly shown in FIGS. 1 and 2 for the front light. As seen in FIGS. 6, 7 and 8, the double-ended clamps 50, each having two clamp legs 61 that can be identical, are clamped onto the seat rail 58 at an outer end, via the essentially cylindrical gripping surface 62, while the other clamp end 54 is clamped onto a ball 36, this end 54 having concave essentially spherical surfaces. On each clamp, a machine bolt 64 between the two clamping ends tightens both clamp ends simultaneously. The machine bolt 64 preferably engages with a nut 66, which can be seated within a shaped nut cavity as shown in FIGS. 9 and 10. Alternatively, the one leg 61 could have a threaded bore to receive a machine screw 64.

FIG. 5 indicates a bicycle accessory device 66 (dashed lines) other than a light, that can be attached to the ball arm 30. This can be a bike computer, a camera, a smartphone (held in a cradle) or other device, and it can be positioned and oriented in a direction desired.

The drawings show that the rear seat mounting assembly is very versatile as well as being quickly and easily installed. Seat rails 58 of different spacings and different orientations can be accommodated. Nearly all seat rails are about the same in diameter, although the system could also accommodate variations in diameter if needed. In the case where rails are closer together than illustrated in these drawings, the clamps 50 can simply be swung to a different angle, toward each other more than what is seen in the drawings. The rear parts of the seat rails extend at an upward angle, and this angle can be quite different from seat to seat. The mounting system will accommodate any angle as well as any spacing. Further, the mounting system allows the clamps 50 to be moved up close to the bottom of the seat 48, with plenty of room on the rails to attach a service pack (with extra tube and tools), which often is hung from the seat rails with straps, as well as being strapped around the seat post.

As in the front light mounting system, the rear light 26a can be adjusted as to height of projection, by swinging the light housing/ball arm assembly up or down via the balls in the clamps.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In combination with a bicycle seat, a rear bicycle light mounting system, comprising:
   a light assembly including a light housing with a fixture secured at rear of the housing, the fixture comprising a generally horizontal ball arm with a ball formed at each end, the ball arm and the two balls being fixed in position relative to the light housing,
   a pair of clamp mounts, each with an adjustable two-legged clamp at one end configured to grip one of said balls, one such clamp secured onto each ball of the fixture so that when tightened the clamp will prevent rotation of the clamp mount about each ball, thus enabling positioning of the clamp mounts and the light housing at desired orientations, each clamp mount having threaded tightening means for tightening the clamp to fix the clamp mount at the desired orientation, each clamp mount having an opposite end with a second clamp, and the tightening means comprising a machine screw engaged in a threaded bore or nut at a position between the opposed clamps for drawing the two leas toward one another so that both clamps on the clamp mount are tightened with a single operation, and wherein the light housing holds a rear bicycle light, with said second clamps at said opposite ends of the clamp mounts being clamped onto a pair of spaced apart seat rails at rear underside of the bicycle seat.

2. In combination with a bicycle seat, a mounting system for securing a light, camera, bike computer, smartphone or other accessory device on a bicycle, comprising:

an accessory device and a fixture secured at rear of the device, the fixture comprising a ball arm with a ball formed at each of two ends, the ball arm and the two balls being fixed in position relative to the accessory device, a pair of clamp mounts, each with an adjustable two-legged clamp at one end configured to grip one of said balls, one such clamp secured onto each ball of the fixture so that when tightened the clamp will prevent rotation of the clamp mount about each ball, thus enabling positioning of the clamp mounts and the device at desired orientations, each clamp mount having threaded tightening means for tightening the clamp to fix the clamp mount at the desired orientation, each clamp mount having an opposite end with a second clamp, and the tightening means comprising a machine screw engaged in a threaded bore or nut at a position between the opposed clamps of the clamp mount for drawing the two legs toward one another so that both clamps on the clamp mount are tightened with a single operation, and wherein the device is a rear accessory device for a bicycle, with said second clamps at said opposite ends of the clamp mounts being clamped onto a pair of spaced apart seat rails at rear underside of the bicycle seat.

3. The mounting system of claim 2, wherein the accessory device is a camera.

4. The mounting system of claim 2, wherein the accessory device is a bike computer.

5. The mounting system of claim 2, wherein the accessory device is a smartphone retained in a cradle secured to the ball arm.

6. The mounting system of claim 2, wherein the accessory is a rear light.

* * * * *